United States Patent
Gong et al.

(10) Patent No.: US 9,220,112 B2
(45) Date of Patent: Dec. 22, 2015

(54) METHOD, DEVICE, AND SYSTEM FOR MULTIPLEXING DATA WITH SELECTED MODULATION AND CODING SCHEMES

(75) Inventors: Zhengwei Gong, Shanghai (CN); Qi Li, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 13/543,498

(22) Filed: Jul. 6, 2012

(65) Prior Publication Data
US 2012/0275417 A1 Nov. 1, 2012

Related U.S. Application Data

(63) Continuation of application No. PCT/CN2011/070086, filed on Jan. 7, 2011.

(30) Foreign Application Priority Data

Jan. 8, 2010 (CN) .......................... 2010 1 0003162

(51) Int. Cl.
*H04W 72/12* (2009.01)
*H04L 5/00* (2006.01)
(Continued)

(52) U.S. Cl.
CPC .......... *H04W 72/1268* (2013.01); *H04L 1/0003* (2013.01); *H04L 1/0009* (2013.01);
(Continued)

(58) Field of Classification Search
CPC ....... H04L 1/003; H04L 1/009; H04L 1/0025; H04L 1/007; H04L 5/0044; H04L 5/0053; H04W 72/046; H04W 72/1268; H04W 72/1284
USPC ........................................................ 370/328
See application file for complete search history.

(56) References Cited

U.S. PATENT DOCUMENTS 6,397,367 B1   5/2002   Park et al.
RE41,498 E     8/2010   Park et al.
(Continued)

FOREIGN PATENT DOCUMENTS

CN   1496011    5/2004
CN   101061686  10/2007
(Continued)

OTHER PUBLICATIONS

"3$^{rd}$ Generation Partnership Project; Technical Specification Group Radio Access Network; Further Advancements for E-ULTRA Physical Layer Aspects (Release 9)". 3GPP TR 36.814 v0.4.1, Feb. 2009 (31 pages).

(Continued)

*Primary Examiner* — Huy D Vu
*Assistant Examiner* — Stephen J Clawson
(74) *Attorney, Agent, or Firm* — Staas & Halsey LLP (57) ABSTRACT

The present invention provides a signal sending method, device, and system. The method includes: A sender performs signal multiplexing processing on a first service data block in service data blocks to be sent and uplink control information, and performs channel interleaving processing on mixed data generated after the signal multiplexing processing, to generate a mixed data block; the sender performs signal spatial multiplexing processing on the mixed data block and remaining service data blocks in the service data blocks to be sent except the first service data block to generate a spatially multiplexed signal, and then sends the spatially multiplexed signal to a receiver through a PUSCH channel. The present invention solves the problem of signal transmission over the PUSCH channel after a MIMO technique is introduced in an LTE-A system.

8 Claims, 4 Drawing Sheets

(51) Int. Cl.
*H04L 1/00* (2006.01)
*H04W 72/04* (2009.01)

(52) U.S. Cl.
CPC ............ *H04L5/0023* (2013.01); *H04L 5/0044* (2013.01); *H04L 5/0053* (2013.01); *H04L 1/007* (2013.01); *H04L 1/0025* (2013.01); *H04W 72/046* (2013.01); *H04W 72/1284* (2013.01)

(56) References Cited

U.S. PATENT DOCUMENTS

| | | | |
|---|---|---|---|
| 2005/0014177 | A1 | 1/2005 | Ranade et al. |
| 2005/0207335 | A1* | 9/2005 | Schmidl et al. ............... 370/206 |
| 2007/0189235 | A1* | 8/2007 | Chandra et al. ............... 370/335 |
| 2008/0153425 | A1* | 6/2008 | Heo et al. ......................... 455/68 |
| 2009/0207836 | A1 | 8/2009 | Kawasaki et al. |
| 2009/0213955 | A1 | 8/2009 | Higuchi et al. |
| 2009/0303937 | A1 | 12/2009 | Sawahashi et al. |
| 2010/0080176 | A1* | 4/2010 | Maas et al. .................... 370/329 |
| 2010/0323625 | A1 | 12/2010 | Kishigami et al. |
| 2011/0026481 | A1 | 2/2011 | Takamatsu |
| 2013/0107745 | A1 | 5/2013 | Oshiba et al. |

FOREIGN PATENT DOCUMENTS

| | | |
|---|---|---|
| CN | 101150568 | 3/2008 |
| CN | 101272370 A | 9/2008 |
| CN | 101291452 | 10/2008 |
| CN | 101442816 | 5/2009 |
| CN | 101512928 | 8/2009 |
| CN | 101997651 | 3/2011 |
| JP | 2007-28569 | 2/2007 |
| JP | 2007-243898 | 9/2007 |
| JP | 2009-213134 | 9/2009 |
| WO | WO 2007/081181 A2 | 7/2007 |
| WO | 2009/020983 A1 | 2/2009 |
| WO | 2009/119767 A1 | 10/2009 |
| WO | 2009/157709 A2 | 12/2009 |
| WO | 2010145588 | 12/2010 |
| WO | 2011082682 | 7/2011 |

OTHER PUBLICATIONS

"R1-082087—Multiplexing of Tank and CQI/PMI in PUSCH Channel" 3GPP TSG-RAN Working Group 1 #53, Kansas City, U.S.A, May 5-9, 2008, Samsung, LGE, Texas Instruments, Panasonic, Qualcomm (4 pages).
Search Report(s) Issued Jul. 24, 2012 and Sep. 21, 2012 in corresponding Chinese Patent Application No. 201010003162.2 (5 pages) (3 pages partial English translation).
First Chinese Office Action issued Oct. 8, 2012 in corresponding Chinese Patent Application No. 201010003162.2 (3 pages) (2 pages English translation).
PCT/ISA/210 issued Apr. 14, 2011 in corresponding International Patent Application No. PCT/CN2011/070086 (2 pages) (5 pages English translation).
International Preliminary Report on Patentability issued Jul. 10, 2012 in corresponding International Patent Application No. PCT/CN2011/070086 (6 pages) (7 pages English translation).

PCT Written Opinion issued Apr. 14, 2011 in corresponding International Patent Application No. PCT/CN/2011/070086 (6 pages).
"3$^{rd}$ Generation Partnership Project; Technical Specification Group Radio Access Network; Evolved Universal Terrestrial Radio Access (E-UTRA); Multiplexing and channel coding (Release 8)," 3GPP TS 36.212 v8.4.0, Sep. 2008 (36 pages).
Office Action issued Dec. 4, 2012 in corresponding European Patent Application No. 11731683.6-2412 (10 pages).
3GPP TR 36.814 v1.5.0, Nov. 2009, "3$^{rd}$ Generation Partnership Project; Technical Specification Group Radio Access Network; Further Advancements for E-UTRA Physical Layer Aspects (Release 9)" (pp. 1-66).
3GPP TSG-RAN WG #53, Kansas City, MO, U.S.A., May 5-May 9, 2008, "Power Offsets to Support PUSCH Data and Control Multiplexing" R1-081911 (from R1-081547) (pp. 1-4).
3GPP TSG WG1 meeting #58, Shenzhen, China, Aug. 24-Aug. 28, 2009, "Channel interleaver and Codeword-to-layer Mapping for LTE-A Uplink Spatial Multiplexing" R1-093054 (pp. 1-10).
3GPP TS 36.212 v9.0.0, Dec. 2009, 3$^{rd}$ Generation Partnership Project; Technical Specification Group Radio Access Network; Evolved Universal Terrestrial Radio Access (E-UTRA); Multiplexing and channel coding (Release 9) (pp. 1-66).
3GPP TSG RAN WG1 meeting #60, San Francisco, US, Feb. 22-26, 2010, "Multiplexing schemes of control and data in multi-layer PUSCH transmission", R1-101073 (pp. 1-6).
3GPP TSG RAN WG1 meeting #60, San Francisco, US, Feb. 22-26, 2010, "Channel interleaver and codeword to layer mapping for UL MIMO", R1-101074 (pp. 1-8).
Mexico Office Action mailed May 6, 2013 in corresponding Mexican Patent Application No. MX/a/2012/007980 (2 pages) (3 pages English explanation).
3 GPP TSG RAN WG1 meeting #59bis R1-100261, "Multiplexing of control and data in multi-layer PUSCH transmission", Valencia, Spain, Jan. 18-22, 2010 (6 pages).
Australian Office Action mailed Aug. 27, 2013 in corresponding Australian Patent Application No. 2011204706 (3 pages).
Mexican Office Action mailed Aug. 28, 2013 in corresponding Mexican Patent Application No. MX/a/2012/007980 (3 pages) (3 pages English Translation).
Japanese Office Action mailed Nov. 12, 2013 in corresponding Japanese Patent Application No. 2012-547443 (2 pages) (3 pages English Translation).
Chinese Office Action dated Jan. 4, 2015 in related Chinese Patent Application No. 201310102495.4 (3 pages).
Chinese Search Report dated Dec. 15, 2014 in related Chinese Patent Application No. 201310102495.4 (2 pages).
Japanese Office Action mailed Mar. 18, 2014 in corresponding Japanese Patent Application No. 2012-547443 (2 pages) (3 pages English Translation).
*3$^{rd}$ Generation Partnership Project; Technical Specification Group Radio Access Network; Evolved Universal Terrestrial Radio Access (E-UTRA); Physical Channels and Modulation* (Release 9); 3GPP TS 36.211 V9.0.0 (Dec. 2009); (85 pages).
*3$^{rd}$ Generation Partnership Project; Technical Specification Group Radio Access Network; Physical layer aspects for evolved Universal Terrestrial Radio Access (UTRA)* (Release 7); 3GPP TR 25.814 V7.1.0 (Sep. 2006); (132 pages).

* cited by examiner

METHOD, DEVICE, AND SYSTEM FOR MULTIPLEXING DATA WITH SELECTED MODULATION AND CODING SCHEMES

CROSS-REFERENCE TO RELATED APPLICATIONS

This application is a continuation of International Application No. PCT/CN2011/070086, filed on Jan. 7, 2011, which claims priority to Chinese Patent Application No. 201010003162.2, filed on Jan. 8, 2010, both of which are hereby incorporated by reference in their entireties.

FIELD OF THE INVENTION

The present invention relates to the field of communications technologies, and in particular to a signal sending method, device, and system.

BACKGROUND OF THE INVENTION

In a long term evolution (Long Term Evolution, abbreviated as LTE) system of the 3rd generation partnership project (3rd Generation Partnership Project, abbreviated as 3GPP), uplink physical channels mainly include channels such as a physical uplink control channel (Physical Uplink Control Channel, abbreviated as PUCCH) and a physical uplink shared channel (Physical Uplink Shared Channel, abbreviated as PUSCH). The PUCCH channel is used to transmit only uplink control information, while the PUSCH channel may be used to transmit uplink shared channel data and the uplink control information simultaneously.

In a signal transmission process of the PUSCH channel in the conventional LTE system, because the LTE system supports a signal-antenna transmission mode, namely, data on one uplink subchannel can only be transferred in one transmission, a user terminal and a relay node perform modulation and coding on a single service data block and uplink control information (Uplink Control Information, abbreviated as UCI) according to a same modulation and coding scheme (Modulation and Coding Scheme, abbreviated as MCS), and then after multiplexing and interleaving processing, send the uplink control information to an evolved nodeB (Evolved NodeB, abbreviated as eNodeB) directly though the PUSCH channel.

With the further evolution of the network, the 3GPP standard also proposes LTE-Advanced (abbreviated as LTE-A) on the basis of the LTE system. An LTE-A system is required to provide higher spectral bandwidth and support more flexible and higher quality communications than the LTE. Therefore, during the process of smooth evolution from the 3GPP standard LTE to the LTE-A, to further increase the uplink spectral efficiency and better fulfill performance of the LTE-A system, a multiple-input multiple-output (Multiple-Input Multiple-Out-put, abbreviated as MIMO) transmission technique is introduced in the PUSCH channel.

Because of the introduction of the MIMO technique in the LTE-A system, multiple antennas are allowed to send and receive multiple service blocks simultaneously, where each service data block matches a single codeword. Therefore, regarding the PUSCH channel of the LTE-A system, a single-codeword signal transmission method of the PUSCH channel in the conventional LTE system is no longer applicable to a multi-codeword data transmission scenario in the LTE-A system, and fails to solve the problem to transmit multiple service data blocks and the uplink control information simultaneously over the PUSCH channel.

SUMMARY OF THE INVENTION

Embodiments of the present invention provide a signal sending method, device, and system, which are used to realize simultaneous transmission of multiple service data blocks and uplink control information over a PUSCH channel in an LTE-A system.

An embodiment of the present invention provides a signal sending method, including:

performing, by a sender, signal multiplexing processing on a first service data block in service data blocks to be sent and uplink control information, and performing channel interleaving processing on mixed data generated after the signal multiplexing processing, to generate a mixed data block; and performing signal spatial multiplexing processing on the mixed data block and a service data block in the service data blocks to be sent except the first service data block to generate a spatially multiplexed signal, and sending the spatially multiplexed signal to a receiver through a PUSCH.

An embodiment of the present invention provides a signal sending device, including:

a multiplexing and interleaving unit, configured to perform signal multiplexing processing on a first service data block in service data blocks to be sent and uplink control information, and perform channel interleaving processing on mixed data generated after the signal multiplexing processing, to generate a mixed data block; and a spatial multiplexing unit, configured to perform signal spatial multiplexing processing on the mixed data block and a service data block in the service data blocks to be sent except the first service data block to generate a spatially multiplexed signal, and transmit the spatially multiplexed signal to a receiver through a PUSCH.

An embodiment of the present invention provides a signal sending system, including the foregoing signal sending device and a signal receiving device connected with the signal sending device.

In the signal sending method, device, and system provided in the embodiments of the present invention, the signal sender in the LTE-A system performs processing such as signal multiplexing and channel interleaving on the uplink control information and one of multiple service data blocks to generate a mixed data block, and then performs signal spatial multiplexing processing on remaining service data blocks and the mixed data block, and then transmits the spatially multiplexed signal after the signal spatial multiplexing processing to the signal receiver through the PUSCH channel. This solves the problem to transmit multiple service data blocks and the uplink control information simultaneously over the PUSCH channel after a MIMO transmission technique is introduced in the LTE-A system, so that the MIMO technique may be well applied to the LTE-A system and an uplink transmission rate of the LTE-A system is increased.

BRIEF DESCRIPTION OF THE DRAWINGS

To explain technical solutions in the embodiments of the present invention or in the prior art more clearly, accompanying drawings required in the description of the embodiments or the prior art are briefly described below. It is apparent that the described accompanying drawings are only some exemplary embodiments of the present invention, and those of ordinary skill in the art may further obtain other drawings from these accompanying drawings without creative efforts.

DETAILED DESCRIPTION OF THE EMBODIMENTS

To make the objectives, technical solutions and benefits of the embodiments of the present invention more clearly, the technical solutions of the embodiments of the present invention are described clearly and completely with reference to the accompanying drawing in the embodiments of the present invention. Apparently, the described embodiments are only part of rather than all the embodiments of the present invention. Based on the embodiments of the present invention, all other embodiments obtained by those of ordinary skill in the art without creative efforts shall fall within the protection scope of the present invention.

Figure 1:
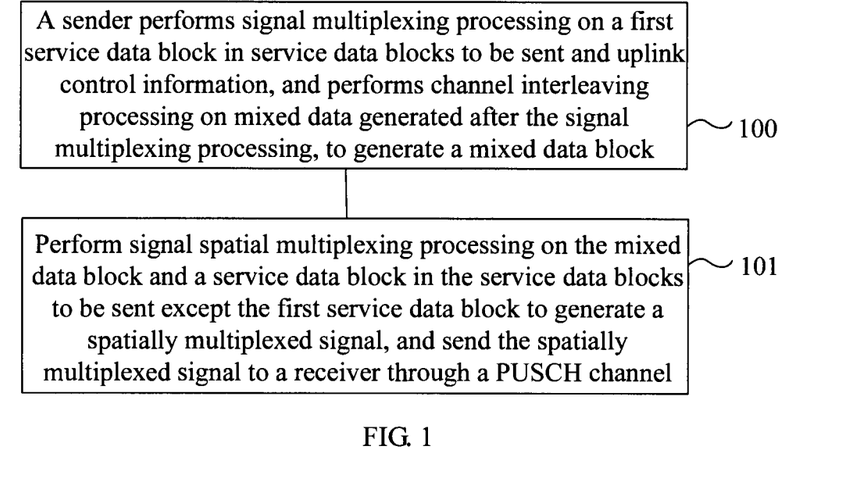
FIG. 1 is a flowchart of a signal sending method according to an embodiment of the present invention.

FIG. 1 is a flowchart of a signal sending method according to an embodiment of the present invention. As shown in FIG. 1, the method according to the embodiment includes the following steps:

Step 100: A sender performs signal multiplexing processing on a first service data block in the service data blocks to be sent and uplink control information, and performs channel interleaving processing on mixed data after the signal multiplexing processing, to generate a mixed data block.

In the embodiment, before sending all service data blocks to be sent and the uplink control information to a receiver through a PUSCH channel at the same time, the sender first performs signal multiplexing and channel interleaving processing on the uplink control information and one of the service data blocks to generate a mixed data block. In the embodiment of the present invention, the service data block that first performs multiplexing and interleaving processing with the uplink control information is referred to as a first service data block. After performing the signal multiplexing processing on the first service data block and the uplink control information, the sender performs channel interleaving processing on the mixed data generated through the signal multiplexing processing to generate the mixed data block.

Step 101: The sender performs signal spatial multiplexing processing on the mixed data block and a service data block in the service data blocks to be sent except the first service data block to generate a spatially multiplexed signal and sends the spatially multiplexed signal to the receiver through the PUSCH channel.

After performing multiplexing and channel interleaving processing on the uplink control information and the first service data block to generate the mixed data block, in order to realize parallel transmission of the remaining service data blocks in the service data blocks to be sent and the generated mixed data block on different spatial subchannels, the sender performs signal spatial multiplexing processing on the remaining service data blocks and the mixed data block to finally generate the spatially multiplexed signal. The spatially multiplexed signal includes the uplink control information and all service data blocks to be sent. The spatially multiplexed signal is a signal that may finally be transmitted by the sender to the receiver through the PUSCH channel. After the sender generates the spatially multiplexed signal, the sender transmits the spatially multiplexed signal to the receiver through the PUSCH channel. Thus, the signal transmission of a user terminal over the PUSCH channel is complete in an LTE-A system.

In the embodiment of the present invention, the signal sender corresponding to the PUSCH channel may be a user terminal, and the corresponding receiver may be a relay node or an eNodeB; or the sender may be a relay node and the corresponding receiver may be an eNodeB. For example, a user terminal sends a signal to an eNodeB through the PUSCH channel; a user terminal sends a signal to a relay node through the PUSCH channel; or a relay node sends a signal to an eNodeB through the PUSCH channel. In the following embodiments of the present invention, an example that a signal is sent by a user terminal to an eNodeB through the PUSCH channel is taken for description. But it should be understood that the other two PUSCH channel signal sending modes are also covered by the protection scope of the embodiments of the present invention.

In the embodiment of the present invention, it is only necessary to perform multiplexing and channel interleaving processing on one of the service data blocks to be sent and the uplink control information to generate a mixed data block, and then perform spatial multiplexing on the mixed data block and the remaining service data blocks to generate a spatially multiplexed signal directly, and send the spatially multiplexed signal to the eNodeB. The uplink control information does not need to be decomposed to separate parts used to perform multiplexing and interleaving processing on different service data blocks respectively to generate different mixed data blocks. Therefore, in the embodiment of the present invention, new rules related to decomposition and cascading of control information does not need to be defined at the receiving and sending ends of the PUSCH channel, and no functional units corresponding to the decomposition and cascading need to be set at the receiving and sending ends. Therefore, in the embodiment of the present invention, when the multiplexing and interleaving is performed on the decomposed uplink control information respectively with different service data blocks, the problem that the drop of transmission performance of the uplink control information is avoided, where the problem is caused by different transmission quality of the uplink subchannels because the control information of different parts needs to be transmitted over different uplink subchannels corresponding to the different service data blocks.

In the signal sending method provided in the embodiment of the present invention, the signal sender in the LTE-A system performs processing such as signal multiplexing and channel interleaving on the uplink control information and one of the multiple service data blocks to generate a mixed data block, and then perform signal spatial multiplexing processing on the remaining service data blocks and the mixed data block, and transmit the spatially multiplexed signal after the signal spatial multiplexing processing to the signal receiver through the PUSCH channel. This solves the problem to transmit multiple service data blocks and the uplink control information simultaneously over the PUSCH channel after a MIMO transmission technique is introduced in the LTE-A system, so that the MIMO technique may be well applied to the LTE-A system and an uplink transmission rate of the LTE-A system is increased.

Figure 2:
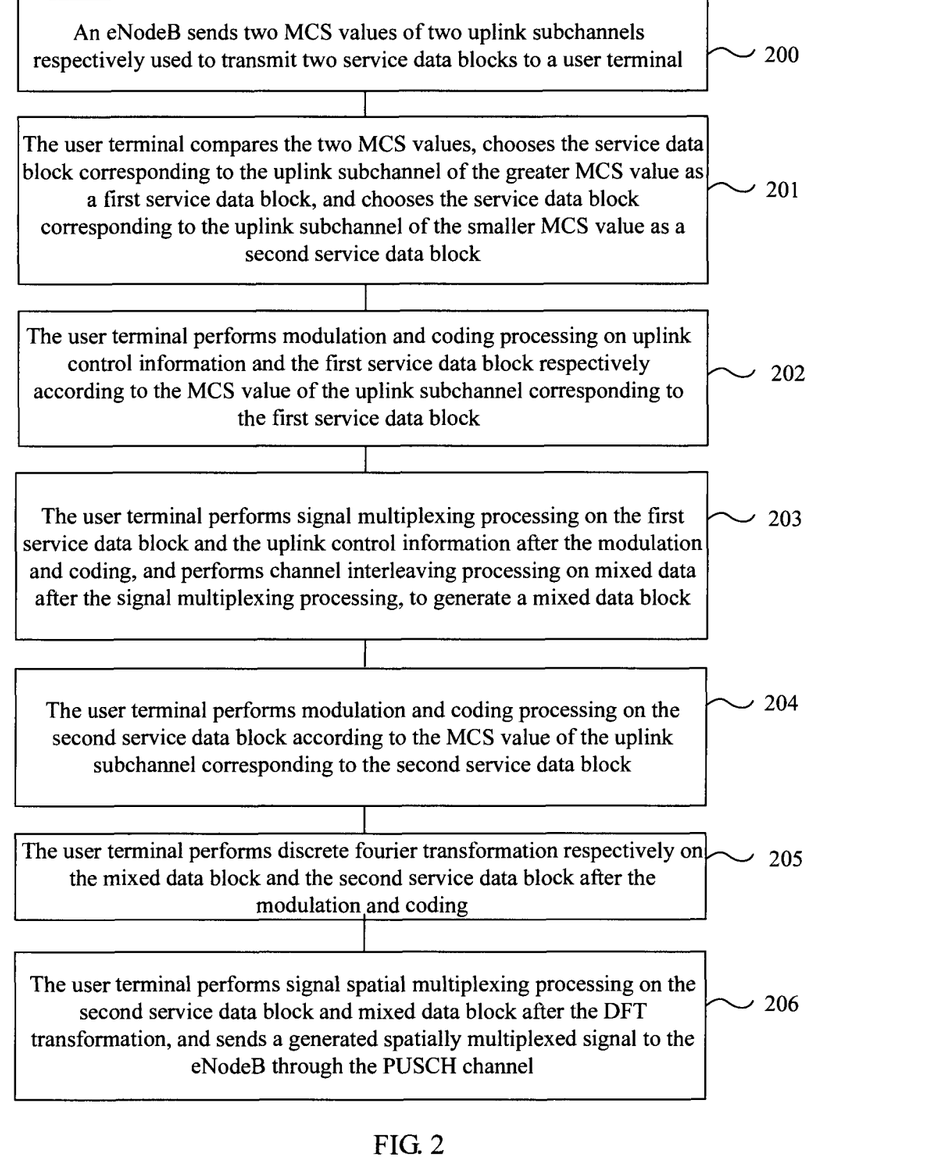
FIG. 2 is a flowchart of another signal sending method according to an embodiment of the present invention.

FIG. 2 is a flowchart of another signal sending method according to an embodiment of the present invention. The embodiment takes two service data blocks as an example and describes simultaneous transmission of two service data blocks and uplink control information over a PUSCH channel. As shown in FIG. 2, the method in the embodiment includes the following steps:

Step 200: An eNodeB sends two MCS values of two uplink subchannels respectively used to transmit two service data blocks to a user terminal.

In an LTE-A system, before the user terminal performs processing on the two service data blocks and the uplink control information and sends the two service data blocks and the uplink control information to the eNodeB through the PUSCH channel, the eNodeB respectively determines MSC values of the two uplink subchannels according to channel quality of the two uplink subchannels which transfer the two service data blocks, and sends the determined MSC values to the user terminal. The MCS values represent modulation and coding grades respectively corresponding to the service data blocks transmitted over an uplink subchannel and are modulation and coding schemes corresponding to the modulation and coding processing required to be performed before multiplexing and interleaving processing are performed on the corresponding service data block and the uplink control information.

The eNodeB may choose, according to the channel quality of the two uplink subchannels and whether a pilot signal is intercepted over the two uplink subchannels, MCS values respectively corresponding to the two uplink subchannels from all MCS values which represent the modulation and coding grades, and send the MCS values to the user terminal. In actual applications, according to the channel quality of different uplink subchannels, the MCS values of different uplink subchannels may be equal or not equal. Generally speaking, the better the quality of an uplink subchannel, the greater the MCS value determined by the eNodeB for the uplink subchannel.

Step 201: The user terminal compares the two MCS values, chooses the service data block corresponding to the uplink subchannel of the greater MCS value as a first service data block, and chooses the service data block corresponding to the uplink subchannel of the smaller MCS value as a second service data block.

In the embodiment, after receiving the two MCS values sent by the eNodeB, the user terminal compares the two MCS values and decides, according to a comparison result, the service data block that is first to be multiplexed and interleaved with the uplink control information. Because the MCS value is determined by the eNodeB according to the respective transmission quality of the two uplink subchannels, the user terminal can know the transmission quality of the two uplink subchannels according to the comparison result. Accordingly, if the user terminal decides, according to this, to first multiplex and interleave the uplink control information with the corresponding service data block over which uplink channel, the uplink control information can be ensured to transmit over a subchannel of better transmission quality.

According to the comparison of the two MCS values, if one MCS value is greater than or equal to the other MCS value, the user terminal chooses the service data block transferred over the uplink subchannel with the greater MCS value as the first service data block to be first mixed with the uplink control information, and chooses the service data block transferred over the uplink subchannel with the other MCS value as the second service data block to be mixed with the uplink control information afterwards.

It should be noted that, in addition to the foregoing mode where the user terminal compares the MCS values, in the embodiment, the eNodeB may compare the MCS values to realize the choice of the first service data block to be first mixed with the uplink control information. That is, after determining the corresponding MCS values for the two uplink subchannels, the eNodeB compares the two MCS values and sends corresponding indication information to the user terminal according to the comparison result. The indication information indicates that one MCS value of the two uplink subchannels is greater than or equal to the other MCS value, so that the user terminal performs multiplexing and channel interleaving processing on the uplink control information with the service data block transmitted over the uplink subchannel with the greater MCS value. For example, if the eNodeB determines that MCS value of the uplink subchannel that transmits the first service data block is greater than or equal to the MCS value of the uplink subchannel that transmits the second service data block, the eNodeB instructs the user terminal to use the first service data and the uplink control information to perform multiplexing and channel interleaving processing through the indication information. The indication information may be 1 bit.

Step 202: The user terminal performs modulation and coding processing on the uplink control information and the first service data block respectively according to the MCS value of the uplink subchannel corresponding to the first service data block.

Step 203: The user terminal performs signal multiplexing processing on the first service data block and uplink control information after the modulation and coding, and performs channel interleaving processing on the mixed data after the signal multiplexing processing, to generate a mixed data block.

After choosing the first service data block according to the MCS values, the user terminal performs multiplexing and interleaving processing on the first service data block and the uplink control information to generate a mixed data block. Specifically, in order to better realize parallel transmission of the first service data block and the uplink control information over the PUSCH channel, the user terminal first performs modulation and coding processing on the first service data block and the uplink control information respectively according to the MCS value of the uplink subchannel corresponding to the chosen first service data block to obtain the uplink control information and first service data block after the modulation and coding. Afterwards, the user terminal performs signal multiplexing processing on the first service data block and uplink control information after the modulation and coding and performs channel interleaving processing on the mixed data after the signal multiplexing processing, to generate a mixed data block.

Performing multiplexing and interleaving processing on the uplink control information with the first service data of better channel quality ensures that more important uplink control information transmitted over the PUSCH channel can be transferred over the subchannel of better channel transmission quality when the uplink control information is transferred to the eNodeB through the PUSCH channel, and thus the transmission quality of the uplink control information over the PUSCH channel is increased.

Step 204: The user terminal performs modulation and coding processing on the second service data block according to the MCS value of the uplink subchannel corresponding to the second service data block.

Step 205: The user terminal performs discrete fourier transformation respectively on the mixed data block and the second service data block after the modulation and coding.

After the user terminal mixes the first service data block and the uplink control information to generate a mixed data block, in order to transmit the mixed data block and the other service data block in parallel over the PUSCH channel, the user terminal performs signal spatial multiplexing on the mixed data block and the second service data block to generate a final transmit signal. Specifically, in order to better realize parallel transmission of the second service data block and the mixed data block over the PUSCH channel, the user terminal may perform modulation and coding processing on the second service data block according to the MCS value of the uplink subchannel corresponding to the second service data block to generate the second service data block after the modulation and coding. Further, in order to enable good frequency domain conversion of the second service data block and the mixed data block to be applied to a spatial multiplexing technique, the user terminal may perform discrete fourier transformation (Discrete Fourier Transformation, abbreviated as DFT) respectively on the second service data block after the modulation and coding and the mixed data block to generate a second service data block and mixed data block after the DFT transformation.

Step 206: The user terminal performs signal spatial multiplexing processing on the second service data block and mixed data block after the DFT transformation, and sends a generated spatially multiplexed signal to the eNodeB through the PUSCH channel.

The user terminal performs signal spatial multiplexing processing on the second service data block and mixed data block after the DFT transformation to generate a final spatially multiplexed signal, where the spatially multiplexed signal includes two service data blocks and uplink control information and is a signal that the user terminal may finally transmit to the eNodeB over the PUSCH channel. During the mixing process of the data signal, the uplink control information is transmitted over the subchannel of better transmission quality. After the user terminal generates the spatially multiplexed signal, the user terminal sends the spatially multiplexed signal to the eNodeB through the PUSCH channel. Thus, the signal transmission of a user terminal over the PUSCH channel is complete in the LTE-A system.

In addition, it should be noted that, although the embodiment specifically describes the transmission of only two service data blocks and the uplink control information over the PUSCH channel, reference may also be made to the signal sending method according to the embodiment when the user terminal needs to send more than two service data blocks and the uplink control information simultaneously over the PUSCH channel. When it is necessary to transmit the uplink control information and more than two service data blocks simultaneously over the PUSCH channel, the user terminal performs multiplexing and channel interleaving on the first service data block in the more than two service data blocks and the uplink control information to obtain a mixed data block, and performs signal spatial multiplexing processing on another service data block in the more than two service data blocks except the first service data block and the mixed data block to generate the final spatially multiplexed signal, and sends the spatially multiplexed signal through the PUSCH channel. When the user terminal needs to transmit more than two service data blocks, through the received MSC values of the uplink subchannels that transmit the service data blocks respectively, the user terminal may also compare these MCS values, and choose the service data block transmitted by the uplink subchannel of the best channel quality, or perform signal multiplexing and channel interleaving processing on the service data block which is transmitted by the uplink subchannel of the best channel quality and determined according to indication information of the eNodeB and the uplink control information to generate a mixed data block. Then, the user terminal performs modulation and coding on the another service data block and performs signal spatial multiplexing on the service data blocks after the modulation and coding and the mixed data block to generate a spatially multiplexed signal. When the indication information indicates the service data block used by the user terminal for multiplexing and interleaving with the uplink control information, the number of bits of the indication information may be determined according to the number of service data blocks to be sent. For example, if four service data blocks need to be transmitted, 2 bits may be used; and if eight service data blocks need to be transmitted, 3 bits may be used.

In the signal sending method provided in the embodiment of the present invention, a signal sender in an LTE-A system performs processing such as signal multiplexing and channel interleaving on the uplink control information and one of the multiple service data blocks to generate a mixed data block, and then perform signal spatial multiplexing processing on the remaining service data blocks and transmit the spatially multiplexed signal to a signal receiver through the PUSCH channel. This solves the problem to transmit multiple service data blocks and the uplink control information simultaneously over the PUSCH channel after a MIMO transmission technique is introduced in the LTE-A system, so that the MIMO technique may be well applied to the LTE-A system and the uplink transmission rate of the LTE-A system is increased. Further, in the embodiment, before the signal sender performs processing on the uplink control information and the service data blocks, after receiving the MCS values determined by the eNodeB respectively with regard to the two uplink subchannels used to transfer the two service data blocks, the sender may also compare the MCS values and mix the uplink control information first with the service data block of the greater MCS value, thus the uplink control information is ensured to be transmitted over the subchannel of better channel quality.

Figure 3:
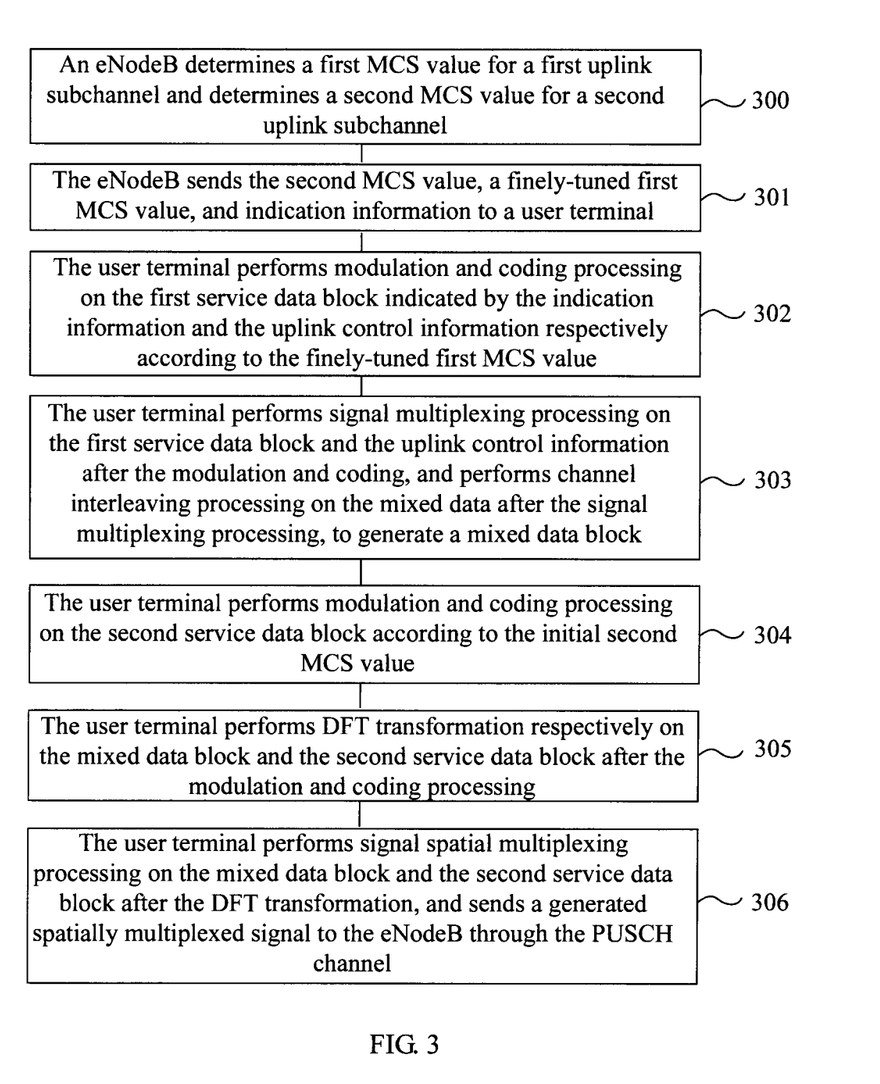
FIG. 3 is a flowchart of another signal sending method according to an embodiment of the present invention.

FIG. 3 is a flowchart of another signal sending method according to an embodiment of the present invention. In this embodiment, two service data blocks are also taken as an example to describe simultaneous transmission of the two service data blocks and uplink control information over a PUSCH channel. As shown in FIG. 3, the method in the embodiment includes the following steps:

Step 300: An eNodeB determines a first MCS value for a first uplink subchannel and determines a second MCS value for a second uplink subchannel.

Step 301: The eNodeB sends the second MCS value, a finely-tuned first MCS value, and indication information to a user terminal.

After the eNodeB determines initial MCS values respectively for the two uplink subchannels, the eNodeB may generate indication information according to the first MCS value and the second MCS value. The indication information indicates the service data block that the user terminal first uses to perform signal multiplexing processing with the uplink control information. In the embodiment of the present invention, one MCS value is greater than or equal to the other MCS value and the indication information instructs the user terminal to use the service data block transmitted by the uplink subchannel corresponding to the greater MCS value to perform multiplexing and channel interleaving with the uplink control information. In the embodiment of the present invention, the greater MCS value is the first MCS value and the other MCS value is the second MCS value. The service data block transmitted by the uplink subchannel corresponding to the first MCS value is the first service data block and the other service data block in the service data blocks to be sent is the second service data block.

Further, in order to enable the first service data block and the uplink control information to obtain better modulation and coding processing during multiplexing and interleaving processing, the eNodeB may finely tunes, according to a size of the uplink control information and a size of a resource respectively corresponding to the two uplink subchannels, the first MCS value determined for the uplink subchannel used to transmit the first service data block. The finely-tuned first MCS value is not smaller than a minimum MCS value corresponding to a same modulation order. The eNodeB sends the second MCS value, the finely-tuned first MCS value, and the generated indication information to the user terminal, so that the user terminal can execute corresponding operations according to content indicated in the indication information. Therefore, in the embodiment, the user terminal does not need to compare the two MCS values. Further, the eNodeB may better guarantee that the uplink control information is transmitted over the uplink subchannel of better transmission quality through better scheduling.

In actual applications, the indication information may be a 1-bit numeric. That is, the eNodeB sends an additional 1-bit numeric to the user terminal when sending the MCS values to the user terminal. The indication numeric may also have another expression form and setting form. The specific expression form and setting form may be determined according to actual situations and are not limited by the embodiment of the present invention.

Step 302: The user terminal performs, according to the finely-tuned MCS value, modulation and coding processing on the first service data block indicated by the indication information and the uplink control information respectively.

After receiving the finely-tuned first MCS value, the initial second MCS value, and the indication information that are sent by the eNodeB, the user terminal parses the indication information and executes different operations according to a parsing result. Specifically, the user terminal performs, according to the received finely-tuned first MCS value, modulation and coding processing on the uplink control information and the first service data block indicated by the indication information respectively to obtain the uplink control information and first service data block after the modulation and coding.

Step 303: The user terminal performs signal multiplexing processing on the first service data block and uplink control information after the modulation and coding, and performs channel interleaving processing on the mixed data after the signal multiplexing processing, to generate a mixed data block.

In the embodiment, the user terminal performs, according to the indication information of the eNodeB, multiplexing and interleaving processing on the uplink control information and the first service data block transmitted by the uplink subchannel of better channel quality, and performs modulation and coding on the uplink control information according to the MCS value finely tuned by the eNodeB, which further guarantees that the modulation and coding processing can be performed on the uplink control information according to a better MCS value after scheduling before the uplink control information is transferred to the eNodeB through the PUSCH channel, and that the uplink control information is transferred over the subchannel of better channel quality. The transmission quality of the uplink control information over the PUSCH channel is also ensured.

Step 304: The user terminal performs modulation and coding processing on the second service data block according to the initial second MCS value.

Step 305: The user terminal performs DFT respectively on the mixed data block and the second service data block after the modulation and coding.

Further, after the user terminal performs multiplexing and interleaving processing on the uplink control information and the first service data block to generate the mixed data block, in order to realize parallel transmission of the second service data block and the mixed data block, the user terminal also performs modulation and coding processing on the second service data block according to the received initial second MCS value. Further, in order to enable good frequency domain conversion of the second service data block and the mixed data block to be applied to a spatial multiplexing technique, the user terminal also performs DFT respectively on the mixed data block and the second service data block after the modulation and coding to generate the second service data block and mixed data block after the DFT transformation.

Step 306: The user terminal performs signal spatial multiplexing processing on the mixed data block and the second service data block after the DFT transformation and sends the generated spatially multiplexed signal to the eNodeB through the PUSCH channel.

In step 306, the user terminal performs signal spatial multiplexing on the mixed data block and the second service data block after the DFT transformation to finally generate the spatially multiplexed signal, and sends the spatially multiplexed signal to the eNodeB through the PUSCH channel. Thus, the signal transmission of a user terminal over the PUSCH channel is complete in the LTE-A system.

In the signal sending method provided in the embodiment of the present invention, a signal sender in an LTE-A system performs processing such as signal multiplexing and channel interleaving on the uplink control information with one of the multiple service data blocks to generate a mixed data block, and then perform signal spatial multiplexing processing on the second service data block, and transmit the generated spatially multiplexed signal after the signal spatial multiplexing processing to a signal receiver through the PUSCH channel. This solves the problem to transmit multiple service data blocks and the uplink control information simultaneously over the PUSCH channel after a MIMO transmission technique is introduced in the LTE-A system, so that the MIMO technique may be well applied to the LTE-A system and an uplink transmission rate of the LTE-A system is increased. Further, in this embodiment, after determining MCS values for the multiple uplink subchannels respectively used to transmit the service data blocks, the eNodeB finely tunes the determined initial MCS value, so that the signal sender performs modulation and coding on the uplink control information and the service data blocks according to the finely-tuned MCS value, and thus guaranteeing that the modulation and coding processing can be performed on the service data blocks and the uplink control information according to a better MCS value after scheduling before the service data blocks and the uplink control information are transferred to the PUSCH channel, and that the service data blocks and the uplink control information can be transmitted over the subchannel of better channel quality.

In the embodiment of the present invention, when the user terminal needs to transmit more than two service data blocks and the uplink control information simultaneously over the PUSCH channel, reference may also be made to the signal sending method in this embodiment. The user terminal may determine, according to the indication information of the eNodeB, the first service data block on which the signal multiplexing and channel interleaving processing are performed with the uplink control information, and receive from the eNodeB the finely-tuned MCS value of the uplink subchannel that transmits the first service data block, then perform modulation and coding on the first service data block and the uplink control information according to the finely-tuned MCS value, and performs signal multiplexing and channel interleaving processing to generate a mixed data block, and then perform modulation and coding on the another service data block and perform signal spatial multiplexing on the another service data block and the mixed data block to generate a spatially multiplexed signal. When the indication information indicates the service block used by the user terminal for multiplexing and interleaving with the uplink control information, the number of bits of the indication information may be determined according to the number of service data blocks to be sent. For example, if four service data blocks need to be transmitted, 2 bits may be used; and if eight service data blocks need to be transmitted, 3 bits may be used.

Those of ordinary skill in the art may understand that all or part of the steps in the foregoing method embodiments may be implemented by a program instructing relevant hardware. The program may be stored in a computer readable storage medium and when the program is executed, the steps in the foregoing method embodiments are executed. The storage medium includes any medium that may store program codes, such as a ROM, a RAM, a magnetic disc, or a compact disc.

Figure 4:
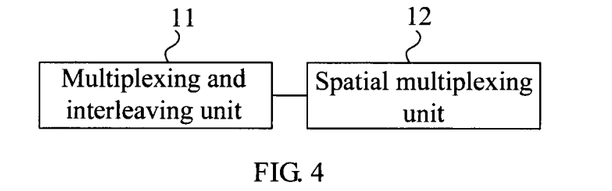
FIG. 4 is a schematic structural diagram of a signal sending device according to an embodiment of the present invention.

FIG. 4 is a schematic structural diagram of a signal sending device according to an embodiment of the present invention. As shown in FIG. 4, the signal sending device in the embodiment includes a multiplexing and interleaving unit 11 and a spatial multiplexing unit 12. The multiplexing and interleaving unit 11 is configured to perform signal multiplexing processing on a first service data block in service data blocks to be sent and uplink control information, and perform channel interleaving processing on mixed data generated after the signal multiplexing processing, to generate a mixed data block. The spatial multiplexing unit 12 is configured to perform signal spatial multiplexing processing on the mixed data block generated by the multiplexing and interleaving unit 11 and a service data block in the service data blocks to be sent except the first service data block to generate a spatially multiplexed signal, and send the spatially multiplexed signal to a receiver through a PUSCH channel.

It should be noted that the PUSCH channel signal sending device in the embodiment of the present invention may be a user terminal in actual applications and a corresponding receiver may be a relay node or an eNodeB; or the signal sending device may also be a relay node and the corresponding receiver may be an eNodeB. Specifically, in the embodiment, for specific work processes related to all units, reference may be made to related contents disclosed in relevant embodiments of the foregoing signal sending method, which are not repeatedly described here.

With the signal sending device in the embodiment of the present invention, before the uplink control information and multiple service data blocks are simultaneously sent to the signal receiver through the PUSCH channel, signal multiplexing and channel interleaving processing are first performed on the uplink control information and one service data block to generate a mixed data block, and then signal spatial multiplexing processing is performed on the remaining service data blocks and the mixed data block, and the spatially multiplexed signal after the signal spatial multiplexing processing is transmitted to the receiver through the PUSCH channel, which solves the problem to transmit multiple service data blocks and the uplink control information simultaneously over the PUSCH channel after a MIMO transmission technique is introduced in an LTE-A system, so that the MIMO technique may be well applied to the LTE-A system and an uplink transmission rate of the LTE-A system is increased.

Figure 5:
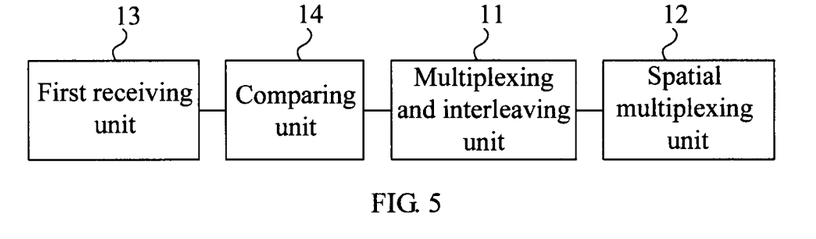
FIG. 5 is a schematic structural diagram of another signal sending device according to an embodiment of the present invention.

FIG. 5 is a schematic structural diagram of another signal sending device according to an embodiment of the present invention. In the embodiment, an MCS value of the uplink subchannel used to transmit the first service data block is greater than or equal to an MCS value of an uplink subchannel used to transmit a remaining service data blocks except the first service data block.

As shown in FIG. 5, on the basis of the foregoing embodiment, the signal sending device in the embodiment further includes a first receiving unit 13 and a comparing unit 14. The first receiving unit 13 is configured to receive the MCS value of the uplink subchannel used to transmit the first service data block, where the MCS value is sent by the receiver, and the MCS value of the uplink subchannel used to transmit the service data block except the first service data block. The comparing unit 14 is configured to compare the MCS value of the uplink subchannel used to transmit the first service data block and the MCS value of the uplink subchannel used to transmit the service data block except the first service data block to obtain that the MCS value of the uplink subchannel used to transmit the first service data block is greater than or equal to the MCS value of the uplink subchannel used to transmit the service data block except the first service data block.

Specifically, in the embodiment, for specific work processes related to all units, reference may be made to related contents disclosed in relevant embodiments of the foregoing signal sending method, which are not repeatedly described here.

With the signal sending device in the embodiment of the present invention, when mixing processing is performed on the uplink control information and each service data block, the MCS value determined by the signal receiver respectively with regard to each uplink subchannel used to transfer each service data block are received, the MCS values are compared, and mixing is performed on the uplink control information first with the service data block of a greater MCS value, which ensures that the uplink control information can be transmitted over the subchannel of better channel quality.

Figure 6:
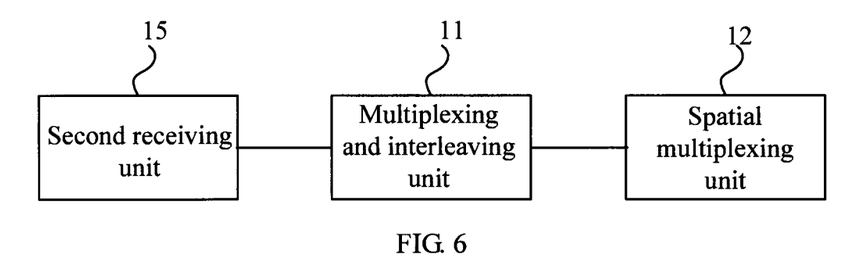
FIG. 6 is a schematic structural diagram of another signal sending device according to an embodiment of the present invention.

FIG. 6 is a schematic structural diagram of another signal sending device according to an embodiment of the present invention. In this embodiment, an MCS value of an uplink subchannel used to transmit a first service data block is also greater than or equal to an MCS value of each uplink subchannel used to transmit a remaining service data blocks except the first service data block. As shown in FIG. 6, in this embodiment, the signal sending device includes a second receiving unit 15 in addition to a multiplexing and interleaving unit 11 and a spatial multiplexing unit 12. The second receiving unit 15 is configured to receive indication information sent by a receiver, where the indication information indicates that the MCS value of the uplink subchannel used to transmit the first service data block is greater than or equal to the MCS value of the uplink subchannel used to transmit the service data block except the first service data block.

Specifically, in this embodiment, for specific work processes related to all units, reference may be made to related contents disclosed in relevant embodiments of the foregoing signal sending method, which are not repeatedly described here.

With the signal sending device in the embodiment of the present invention, when mixing processing is performed on the uplink control information and each service data block, mixing is performed first on the uplink control information with the service data block of the greater MCS value according to the received indication information which is sent by the signal receiver and indicates the MCS value of each uplink subchannel used to transmit each service data block, which ensures that the uplink control information can be transmitted over the subchannel of better channel quality.

Figure 7:
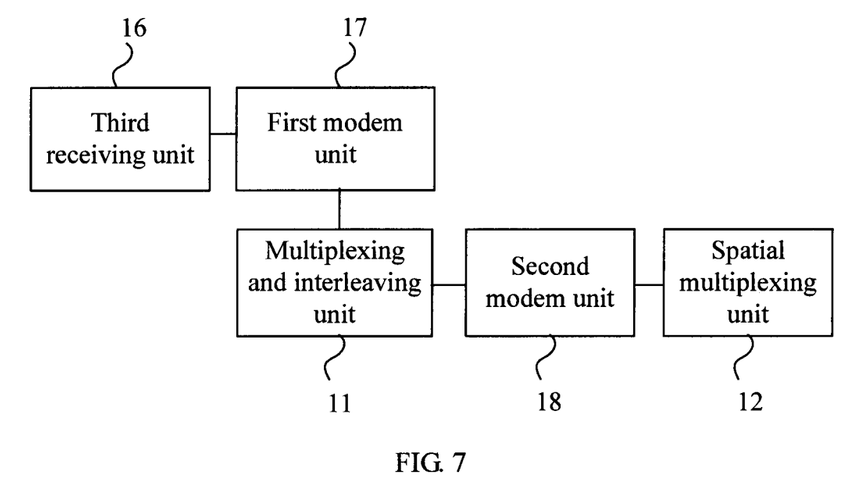
FIG. 7 is a schematic structural diagram of another signal sending device according to an embodiment of the present invention.

FIG. 7 is a schematic structural diagram of another signal sending device according to an embodiment of the present invention. As shown in FIG. 7, the signal sending device in this embodiment includes not only a multiplexing and interleaving unit 11 and a spatial multiplexing unit 12 but also a third receiving unit 16, a first modem unit 17, and a second modem unit 18.

The third receiving unit 16 is configured to receive from a receiver indication information, a finely-tuned MCS value of an uplink subchannel used to transmit a first service data block, and MCS value of an uplink subchannel used to transmit a service data block except the first service data block, where the indication information indicates that the first service data block is the service data block used by the signal sending device in this embodiment to perform signal multiplexing processing with the uplink control information. The first modem unit 17 is configured to perform modulation and coding processing on the first service data block and the uplink control information respectively according to the received finely-tuned MCS value of the uplink subchannel used to transmit the first service data block. The second modem unit 18 is configured to perform, according to the received MCS value of the uplink subchannel used to transmit the service data block in the service data blocks to be sent except the first service data block, modulation and coding processing on the service data block in the service data blocks to be sent except the first service data block.

Specifically, in this embodiment, for specific work processes related to all units, reference may be made to related contents disclosed in relevant embodiments of the foregoing signal sending method, which are not repeatedly described here.

With the signal sending device in the embodiment of the present invention, when mixing processing is performed on the uplink control information and each service data block, the signal receiver further finely tunes the determined initial MCS values after determining the MCS values of multiple uplink subchannels used to transfer multiple service data blocks respectively, so that the signal sending device performs modulation and coding on the service data block and the uplink control information according to the finely-tuned MCS values, which further ensures that before the service data blocks and the uplink control information are transferred to the PUSCH channel, modulation and coding processing can be performed according to a better MCS value after scheduling, and that transmission can be performed over the subchannel of better channel quality.

Figure 8:
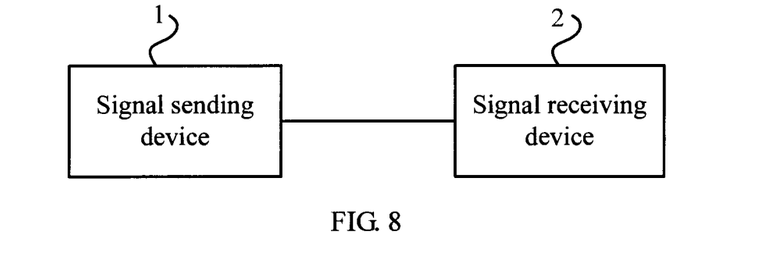
FIG. 8 is a schematic structural diagram of a signal sending system according to an embodiment of the present invention.

FIG. 8 is a schematic structural diagram of a PUSCH signal sending system according to an embodiment of the present invention. As shown in FIG. 8, the signal sending system in this embodiment includes a signal sending device 1 and a signal receiving device 2 connected with the signal sending device 1. Specifically, the signal sending device 1 and the signal receiving device 2 in this embodiment may respectively be a user terminal and a relay node, or the signal sending device 1 and the signal receiving device 2 may respectively be a user terminal and an eNodeB; or the signal sending device 1 and the signal receiving device 2 may respectively be a relay node and an eNodeB.

For all units included in the signal sending device 1 in this embodiment and specific processes related to all units, reference may be made to related contents disclosed in relevant embodiments of the foregoing signal sending method and the signal sending device, which are not repeatedly described here.

With the signal sending system in the embodiment of the present invention, a signal sender in an LTE-A system performs processing such as signal multiplexing and channel interleaving on the uplink control information and one of the multiple service data blocks to generate a mixed data block, and performs signal spatial multiplexing processing on the remaining service data blocks and the mixed data block, and then transmits the generated spatially multiplexed signal to the eNodeB through the PUSCH channel. This solves the problem to transmit multiple service data blocks and the uplink control information simultaneously over the PUSCH channel after a MIMO transmission technique is introduced in the LTE-A system, so that the MIMO technique may be well applied to the LTE-A system and an uplink transmission rate of the LTE-A system is increased.

Finally, it should be noted that, the foregoing embodiments are merely used to describe instead of limit the technical solutions of the present invention; although the present invention is described in detail with reference to the foregoing embodiments, it should be understandable that those of ordinary skill in the art may still make modifications to the technical solutions described in the foregoing embodiments or equivalent replacements to part of the technical characteristics of the foregoing embodiments; however, all these modifications or replacements do not deviate the nature of the corresponding technical solutions from the spirit and scope of the technical solutions in the embodiments of the present invention.

What is claimed is:

1. A signal sending method, comprising:
receiving, by a terminal, Modulation and Coding Scheme (MCS) values of uplink subchannels used to transmit service data blocks;
performing using multiple input and multiple output (MIMO) technology, by the terminal, signal multiplexing processing on one first service data block in the service data blocks to be transmitted on an uplink subchannel from among the uplink subchannels and on uplink control information of the uplink subchannel used to transmit the one first service data block to generate mixed data, wherein an MCS value of the uplink subchannel used to transmit the one first service data block is greater than the MCS values of the uplink subchannels used to transmit remaining service data blocks except the one first service data block;
performing, by the terminal, channel interleaving processing on the mixed data to generate a mixed data block;
performing, by the terminal, signal spatial multiplexing processing on the mixed data block and the remaining service data blocks of the service data blocks to be transmitted except the one first service data block to generate a spatially multiplexed signal; and transmitting on the uplink subchannel used to transmit the one first service data block, by the terminal, the spatially multiplexed signal to a receiver through a physical uplink shared channel.

2. The signal sending method according to claim 1, further comprising:

receiving, from the receiver, the MCS value of the uplink subchannel used to transmit the one first service data block and the MCS values of the uplink subchannels used to transmit the remaining service data blocks except the one first service data block; and comparing the MCS value of the uplink subchannel used to transmit the one first service data block and the MCS values of the uplink subchannels used to transmit the remaining service data blocks except the one first service data block to obtain the MCS value of the uplink subchannel used to transmit the one first service data block that is greater than the MCS values of the uplink subchannels used to transmit the remaining service data blocks except the one first service data block.

3. The signal sending method according to claim 1, further comprising:

receiving indication information transmitted by the receiver, wherein the indication information indicates that the MCS value of the uplink subchannel used to transmit the one first service data block is greater than the MCS values of the uplink subchannels used to transmit the remaining service data blocks except the one first service data block.

4. The signal sending method according to claim 1, further comprising:

receiving, from the receiver, indication information, the MCS value of the uplink subchannel used to transmit the one first service data block, and the MCS values of the uplink subchannels used to transmit the remaining service data blocks except the one first service data block, wherein the indication information indicates that the one first service data block is a service data block used by the terminal to perform the signal multiplexing processing with the uplink control information;

performing modulation and coding processing on the one first service data block and the uplink control information respectively according to the MCS value of the uplink subchannel used to transmit the one first service data block before the terminal performs the signal multiplexing processing on the one first service data block in the service data blocks to be transmitted and the uplink control information; and performing modulation and coding processing on the one service data block in the service data blocks to be transmitted except the one first service data block according to the MCS values of the uplink subchannels used to transmit the remaining service data blocks except the one first service data block before the signal spatially multiplexing processing is performed on the mixed data block and the remaining service data blocks in the service data blocks to be transmitted except the one first service data block.

5. The signal sending method according to claim 4, wherein the MCS value of the uplink subchannel used to transmit the one first service data block is obtained by tuning the MCS value of the uplink subchannel used to transmit the one first service data block according to a size of the uplink control information and a size of a resource corresponding to the uplink subchannel of the service data blocks to be transmitted.

6. A signal sending device, comprising:

non-transitory computer readable storage medium to store program(s), and computer hardware configured, including configured by the program(s), to:

receive, from an eNodeB, Modulation and Coding Scheme (MCS) values of uplink subchannels used to transmit service data blocks;

perform, using multiple input and multiple output (MIMO) technology, signal multiplexing processing on one first service data block in service data blocks to be transmitted on an uplink subchannel from among the uplink subchannels and on uplink control information of the uplink subchannel used to transmit the one first service data block to generate mixed data, wherein an MCS value of the uplink subchannel used to transmit the one first service data block is greater than the MCS values of the uplink subchannels used to transmit remaining service data blocks except the one first service data block, and perform channel interleaving processing on the mixed data to generate a mixed data block;

perform signal spatial multiplexing processing on the mixed data block and the remaining service data blocks in the service data blocks to be transmitted except the one first service data block to generate a spatially multiplexed; and transmit on the uplink subchannel used to transmit the one first service data block the spatially multiplexed signal to the eNodeB through a physical uplink shared channel, wherein the MCS value of the uplink subchannel used to transmit the one first service data block is compared with the MCS values of uplink subchannels used to transmit the remaining service data blocks except the one first service data block, to obtain the MCS value of the uplink subchannel used to transmit the first service data block that is greater than the MCS values of the uplink subchannels used to transmit the remaining service data blocks except the one first service data block.

7. A signal sending device, comprising:

non-transitory computer readable storage medium to store program(s), and computer hardware configured, including configured by the program(s), to implement:

receive, from an eNodeB, Modulation and Coding Scheme (MCS) values of uplink subchannels used to transmit service data blocks;

perform, using multiple input and multiple output (MIMO) technology, signal multiplexing processing on one first service data block in service data blocks to be transmitted on an uplink subchannel from among the uplink subchannels and on uplink control information of the uplink subchannel used to transmit the one first service data block to generate mixed data, wherein an MCS value of the uplink subchannel used to transmit the one first service data block is greater than the MCS values of the uplink subchannels used to transmit remaining service data blocks except the one first service data block, and perform channel interleaving processing on the mixed data to generate a mixed data block;

perform signal spatial multiplexing processing on the mixed data block and the remaining service data blocks in the service data blocks to be transmitted except the one first service data block to generate a spatially multiplexed signal; and transmit on the uplink subchannel used to transmit the one first service data block the spatially multiplexed signal to the eNode B through a physical uplink shared channel.

8. A signal sending device, comprising:

non-transitory computer readable storage medium to store program(s), and computer hardware configured, including configured by the program(s), to implement:

receive, from an eNodeB, Modulation and Coding Scheme (MCS) values of uplink subchannels used to transmit service data blocks;

perform, using multiple input and multiple output (MIMO) technology, signal multiplexing processing on one first service data block in service data blocks to be transmitted on an uplink subchannel from among the uplink subchannels and on uplink control information of the uplink subchannel used to transmit the one first service data block to generate mixed data, wherein an MCS value of the uplink subchannel used to transmit the one first service data block is greater than the MCS values of the uplink subchannels used to transmit remaining service data blocks except the one first service data block, and perform channel interleaving processing on the mixed data to generate a mixed data block;

perform signal spatial multiplexing processing on the mixed data block and the remaining service data blocks in the service data blocks to be transmitted except the one first service data block to generate a spatially multiplexed signal; and transmit on the uplink subchannel used to transmit the one first service data block the spatially multiplexed signal to the eNodeB through a physical uplink shared channel, wherein the computer hardware is further configured to perform modulation and coding processing on the one first service data block and the uplink control information respectively according to the MCS value of the uplink subchannel used to transmit the one first service data block; and perform modulation and coding processing on the remaining service data blocks in the service data blocks to be transmitted except the one first service data block according to the MCS values of the uplink subchannels used to transmit the remaining service data blocks except the one first service data block.

* * * * *